(12) United States Patent
Razban et al.

(10) Patent No.: US 10,977,586 B2
(45) Date of Patent: Apr. 13, 2021

(54) FORECASTING AND MANAGING DAILY ELECTRICAL MAXIMUM DEMANDS

(71) Applicant: The Trustees of Indiana University, Indianapolis, IN (US)

(72) Inventors: Ali Razban, Carmel, IN (US); Da-Chun Wu, Indianapolis, IN (US); Amin Amini, Irvine, CA (US); Jie Chen, Carmel, IN (US)

(73) Assignee: The Trustees of Indiana University, Bloomington, IN (US)

( * ) Notice: Subject to any disclaimer, the term of this patent is extended or adjusted under 35 U.S.C. 154(b) by 0 days.

(21) Appl. No.: 16/272,759

(22) Filed: Feb. 11, 2019

(65) Prior Publication Data
US 2019/0251484 A1    Aug. 15, 2019

Related U.S. Application Data

(60) Provisional application No. 62/630,134, filed on Feb. 13, 2018.

(51) Int. Cl.
*G06F 1/3203*    (2019.01)
*G06Q 10/04*    (2012.01)
(Continued)

(52) U.S. Cl.
CPC .......... *G06Q 10/04* (2013.01); *G06F 1/3203* (2013.01); *G06F 9/3004* (2013.01); *H02J 3/00* (2013.01);
(Continued)

(58) Field of Classification Search
CPC ..... G06Q 10/04; G06F 1/3203; G06F 9/3004; H02J 3/00; H02J 3/14; H02J 3/003; H02J 2203/20
See application file for complete search history.

(56) References Cited

U.S. PATENT DOCUMENTS

| | | | |
|---|---|---|---|
| 2003/0083788 A1* | 5/2003 | Harada | G05B 15/02 700/291 |
| 2013/0018821 A1* | 1/2013 | Shao | G06Q 50/06 705/412 |

(Continued)

OTHER PUBLICATIONS

Woo-Joo Lee, Jinkyu Hong, "A Hybrid dynamic and fuzzy time series model for mid-term power load forecasting", Electrical Power & Energy Systems, 64 (2015), p. 1057-1062.

(Continued)

*Primary Examiner* — Thomas C Lee
*Assistant Examiner* — Gary Collins
(74) *Attorney, Agent, or Firm* — Faegre Drinker Biddle & Reath LLP

(57) ABSTRACT

Systems and methods are provided for forecasting and managing daily electrical demands. In some embodiments, a computing platform may receive historical demand data corresponding to historical electrical demand over a first period of time. Next, the computing platform may determine a reference rate of change (ROC) and a statistical mode corresponding to a number of positive ROCs. After, the computing platform may receive current demand data corresponding to current electrical demand over a second period of time. Subsequently, the computing platform may determine an alarm condition corresponding to a daily peak electrical demand. Following, the computing platform may generate one or more commands directing a second computing platform to display the alarm condition. Afterwards, the computing platform may transmit the one or more commands directing the second computing platform to display the alarm condition.

18 Claims, 10 Drawing Sheets

Calculating Number of ROCs to Determine Maximum Daily Demands

| | Time | kW | ROC | Positive? |
|---|---|---|---|---|
| | 2:30:00 PM | 289.3 | | |
| | 2:45:00 PM | 278.64 | -0.710 | 0 |
| | 3:00:00 PM | 399.96 | 8.088 | 1 |
| | 3:15:00 PM | 451.44 | 3.432 | 1 |
| Daily Peak | 3:30:00 PM | 461.16 | 0.648 | 1 |
| | 3:45:00 PM | 421.21 | -2.663 | 0 |
| Total steps involved in peak development | | | | 3 |

(51) Int. Cl.
 H02J 3/14 (2006.01)
 G06F 9/30 (2018.01)
 H02J 3/00 (2006.01)
(52) U.S. Cl.
 CPC .............. *H02J 3/14* (2013.01); *H02J 3/003* (2020.01); *H02J 2203/20* (2020.01)

(56) References Cited

U.S. PATENT DOCUMENTS

| | | | | |
|---|---|---|---|---|
| 2014/0058572 | A1* | 2/2014 | Stein | H02J 13/0017 700/291 |
| 2016/0202682 | A1* | 7/2016 | Matsumoto | H02J 3/14 700/291 |

OTHER PUBLICATIONS

M.S. Kandil, S.M. El-Debeiky, Long-term Load Forecasting for Fast Developing Utility Using a Knowledge-Based Expert System, IEEE Transactions on Power Systems, vol. 17, No. 2, May 2002; 6 pages.

Eisa Almeshaiei, Hassan Soltan, "A methodology for Electric Power Load Forecasting", Alexandria Engineering Journal, 2011.

Wiktor Charytoniuk, Mo-Shing Chen, "Very Short-Term Load Forecasting Using Artificial Neural Networks", IEEE Transactions on Power Systems, vol. 15, No. 1, Feb. 2000; 6 pages.

Eva Gonzalez-Romera, Miguel A. Jaramillo-Moran, Diego Carmona-Fernandez, "Monthly Electric Energy Demand Forecasting Based on Trend Extraction", IEEE Transactions on Power Systems, vol. 21, No. 4, Nov. 2006; 8 pages.

Abderrezak Laouafi, Mourad Mordjaoui, Farida Laouafi, Department of Electrical Engineering University, Aug. 20, 1955, "An Evaluation of Conventional and Computational Intelligence Methods for Medium and Long-Term Load Forecasting in Algeria".

Engr. Badar Ul Islam, Dept. Computer Science & Engineering, NFC-Institute of Engineering & Fertilizer Research, "Comparison of Conventional and Modern Load Forecasting Techniques Based on Artificial Intelligence and Expert Systems", IJCSI International Journal of Computer Science Issues, vol. 8, Issue 5, No. 3, Sep. 2011; 10 pages.

Rafal Weron, "Modeling and Forecasting Electricity Loads and Prices, A Statistical Approach", John Wiley & Sons, Ltd.; 35 pages.

Laouafi Abderrezak, Mordjaoui Mourad, Dib Djalel, "Very Short-Term Electricity Demand Forecasting using Adaptive Exponential Smoothing Methods"; 5 pages.

Miguel A. Jaramillo-Moran, Eva Gonzalez-Romera, Diego Carmona-Fernandez, "Electrical Power and Energy Systems", Electrical Power & Energy Systems, 49 (2013); p. 253-263.

Zhiheng Zhang, Shijie Ye, "Long Term Load Forecasting and Recommendations for China Based on Support Vector Regression", 2011 International Conference on Information Management, Innovation Management and Industrial Engineering; 6 pages.

Hong-ze Li, Sen Guo, Chun-jie Li, Jing-qi Sun, "A hybrid annual power load forecasting model based on generalized regression neural network with fruit fly optimization algorithm", Knowledge-Based Systems, 37 (2013), p. 378-387.

Kianoosh G. Boroojeni, M. Hadi Amni, Shahab Bahrami, S.S. Lyengar, Arif I. Sarwat, Orkun Karabasoglu, "A novel multi-time-scale modeling for electric power demand forecasting: From short-term to medium -term horizon", Electric Sower Systems Research, 142 (2017), p. 58-73.

Abderrezak Laouafi, Mourad Mordjaoui, Djalel Dib, "One-hour Ahead Electric load forecasting using Neuro-Fuzzy system in a Parallel Approach"; 28 pages.

World Energy Outlook 2015, International Energy Agency Secure Sustainable Together; 58 pages.

Forecasting: Principles and Practice, Rob J. Hyndman, University of Western Australia, Sep. 23-25, 2014; 7 pages.

* cited by examiner

Calculating Number of ROCs to Determine Maximum Daily Demands

| Time | kW | ROC | Positive? |
|---|---|---|---|
| 2:30:00 PM | 289.3 | | |
| 2:45:00 PM | 278.64 | -0.710 | 0 |
| 3:00:00 PM | 399.96 | 8.088 | 1 |
| 3:15:00 PM | 451.44 | 3.432 | 1 |
| *Daily Peak* 3:30:00 PM | 461.16 | 0.648 | 1 |
| 3:45:00 PM | 421.21 | -2.663 | 0 |
| Total steps involved in peak development | | | 3 |

Figure 4

Results of Pearson's Chi-Squared Test

Data * Prediction Cross tabulation

|  |  |  | Prediction | | Total |
|---|---|---|---|---|---|
|  |  |  | 0 | 1 (Peak) |  |
| Data | 0 | Count | 784a | 101b | 885 |
|  |  | % within Prediction | 88.6% | 11.4% | 100.0% |
|  |  | % within Data | 97.9% | 59.8% | 91.2% |
|  |  | % of Total | 80.8% | 10.4% | 91.2% |
|  | 1 (Peak) | Count | 17a | 68b | 85 |
|  |  | % within Prediction | 20.0% | 80.0% | 100.0% |
|  |  | % within Data | 2.1% | 40.2% | 8.8% |
|  |  | % of Total | 1.8% | 7.0% | 8.8% |
| Total |  | Count | 801 | 169 | 970 |
|  |  | % within Data | 82.6% | 17.4% | 100.0% |
|  |  | % within Prediction | 100.0% | 100.0% | 100.0% |
|  |  | % of Total | 82.6% | 17.4% | 100.0% |

Figure 7

Device Overview

FORECASTING AND MANAGING DAILY ELECTRICAL MAXIMUM DEMANDS

CROSS REFERENCE TO RELATED APPLICATIONS

This application claims the benefit of U.S. Provisional Patent Application No. 62/630,134, filed Feb. 13, 2018 and entitled "Forecasting and Managing Daily Electrical Maximum Demand," the entire disclosure of which is hereby incorporated herein by reference in its entirety.

FIELD OF THE DISCLOSURE

The present disclosure generally relates to systems and methods for determining electrical demands. In particular, the present disclosure relates to systems and methods for forecasting and managing daily electrical maximum demands.

BACKGROUND OF THE DISCLOSURE

Utility companies have studied electrical demand forecasting. However, most of the studies propose the concept and necessity of demand forecasting, a technique for load forecasting, pros and cons, verification of the method, and its application in the real world. Maximum demand forecasting is usually the result of load forecasting in these literatures. In other words, most of the work has been done in forecasting the load pattern as the first step, instead of predicting the maximum demand itself. Forecasting the load pattern requires more data as input, and intense calculation. In comparison, forecasting the maximum demand on the consumer side, known as "behind the meter", can be as hard as forecasting on the utility side due to the fact that the consumer side has much lower load in comparison to utility load. This load profile is more sensitive to the major energy consuming equipment such as chillers, Heating, Ventilation Air-Conditioning (HVAC) systems, compressors and large motors.

SUMMARY

Disclosed herein are systems and methods for predicting short-term electrical maximum demands using historical demand data. Recognizing a peak demand pattern for commercial or industrial customers would propose numerous direct and indirect benefits to customers and utility providers, i.e., demand response, generation cost control, and system stability. The systems and methods for predicting short-term electrical maximum demands using historical demand data, referred to as Adaptive Rate of Change (ARC), determines the rate-of-change in load profile prior to a peak by postulating the demand curve as a stochastic, mean-reverting process. Using ARC, the energy efficient program does not require demand estimation but only to warn the user of imminent maximum peak occurrence. The systems and methods disclosed herein may analyze demand trend data and may incorporate moving average calculation as well as rate of change formularization to develop an electrical maximum demand forecasting algorithm, which has been statistically evaluated by a Chi-square test. Three different manufacturing facilities, with different load profile patterns, were selected as target case studies. The results using these systems and methods have shown 80% accuracy with a P-value approaching 0 in three significant digits (<0.00).

In some examples, a method, system, or device is used to forecast and manage maximum electrical demands. For example, a method or device, such as a first computing platform, receives historical demand data corresponding to historical electrical demand over a first period of time for an entity. The method or device determines, based on the historical demand data, a reference rate of change (ROC) and a statistical mode corresponding to a number of positive ROCs. The method or device receives current demand data corresponding to current electrical demand over a second period of time. The method or device determines, based on the statistical mode, the reference ROC, and the current demand data, an alarm condition indicating a daily peak electrical demand for the entity. The method or device generates one or more commands directing a second computing platform to display the alarm condition. The method or device transmits, to the second computing platform, the one or more commands directing the second computing platform to display the alarm condition indicating the daily peak electrical demand for the entity.

In some instances, the method or device receives the historical demand data from a utility provider computing platform corresponding to a utility provider. In some examples, the entity is a manufacturing facility, a residential building, and/or a commercial building. In some variations, the method or device calculates, based on the electrical demand of the entity, a plurality of ROCs, and each ROC from the plurality of ROCs has a corresponding time range from the plurality of time ranges. The method or device determines the reference ROC and the statistical mode based on the plurality of ROCs corresponding to the plurality of time ranges.

In some instances, the method or device determines a plurality of peak electrical demands for the plurality of time ranges, wherein each of the plurality of peak electrical demands has a corresponding time range from the plurality of time ranges. The method or device determines a number of positive ROCs, from the plurality of ROCs, for each of the plurality of peak electrical demands to develop. The method or device determines the reference ROC and the statistical mode based on determining the statistical mode of the number of positive ROCs for the plurality of peak electrical demands. In some examples, the number of positive ROCs for each of the plurality of peak electrical demands to develop comprises the number of positive ROCs corresponding to a subset of time ranges, from the plurality of time ranges, immediately prior to the corresponding time range for each of the plurality of peak electrical demands.

In some variations, the method or device determines a current ROC from the current demand data. The method or device determines the alarm condition based on comparing the current ROC with the reference ROC. In some instances, the current demand data comprises a current demand and a plurality of previous demands. The method or device calculates, from the plurality of previous demands, a moving average and a standard deviation. The method or device determines the alarm condition based on comparing the moving average plus the standard deviation with a current demand from the current demand data.

In some instances, the one or more commands directs the second computing platform to reduce electrical consumption demand of the entity. In some examples, the entity comprises a plurality of subsystems, and the one or more commands directs the second computing platform to reduce electrical consumption demand of at least one subsystem from the plurality of subsystems.

Additional features and advantages of the present disclosure will become apparent to those skilled in the art upon consideration of the following detailed description of the illustrative embodiment exemplifying the best mode of carrying out the invention as presently perceived.

BRIEF DESCRIPTION OF THE DRAWINGS

The embodiments will be more readily understood in view of the following description when accompanied by the below figures and wherein like reference numerals represent like elements, wherein:

FIG. 4 shows an example table for calculating a number of rate-of-changes (ROCs) to determine maximum daily demands;

FIG. 7 shows an example table describing results of a Pearson's Chi-Squared Test;

Figure 1:
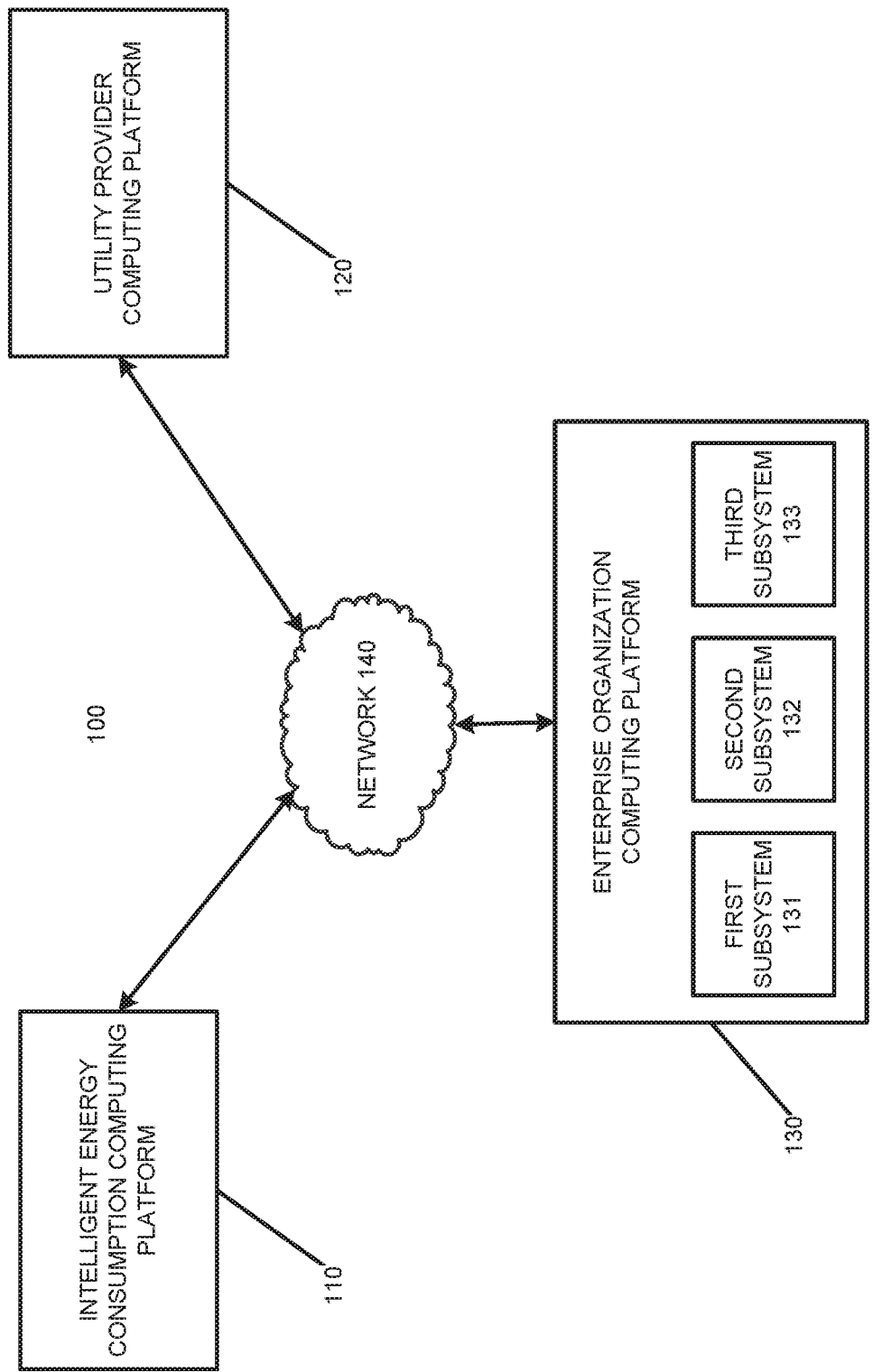
FIG. 1 shows a block diagram of a system and environment for forecasting and managing daily electrical maximum demands.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate an exemplary embodiment of the disclosure, in one form, and such exemplifications are not to be construed as limiting the scope of the disclosure in any manner.

DETAILED DESCRIPTION OF EMBODIMENTS

Preferred embodiments of the present disclosure are described below by way of example only, with reference to the accompanying drawings. Further, the following description is merely exemplary in nature and is in no way intended to limit the disclosure, its application, or uses. As used herein, the term "module" or "unit" may refer to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the modules, the scope of the present system should not be so limited since other modifications will become apparent to the skilled practitioner.

By 2040, electrical demand is estimated to increase globally by 85% as economies expand, living standards increase, and modernization and industrial development accelerate globally. Electrical demand forecasting plays a pivotal role in power system management, especially for ensuring economic and reliable operation in power systems. To achieve this end, electrical utility companies may use consumption load forecasting models, to ensure the load factor of one occurs at any time that the supplied electric energy meets the load requirement plus the energy lost in the power system. However, adjusting the supply-demand balance in the electric system at any time requires utilizing different models for load forecasting on a variety of time horizons. Moreover, demand forecasting may be a very strong tool on the consumer side. Load forecasting may be categorized based on the time scale, including Very Short-Term Load Forecasting (VSTLF), Short-Term Load Forecasting (STLF), Medium-Term Load Forecasting (MTLF) and Long-Term Load Forecasting (LTLF). VSTLF may be used for load-frequency control and detecting contingencies in power system. STLF may be utilized from an hour-ahead to a day-ahead forecasting in power system operation. MTLF and LTLF may be ranged respectively from one week to one year, and one year to decades. From the demand side's point of view, demand monitoring and forecasting has become a crucial part of power system in recent years. Demand charge has been increasing dramatically in most dense populated cities. Furthermore, future power systems and smart grids require advance metering systems to improve the reliability of demand in the conventional power systems.

Introduction

A time-series is a sequence of data points, usually consisting of consecutive measurements occurring over a time interval. Representing the demand pattern as a time series is generally accepted. The time series function may potentially comprise one or more components and/or factors (time, social, economic, or environmental). The time series function may then be modelled as a stochastic process, represented by Gupta as:

$$X_t = T_t + S_t + I_t, \tag{1}$$

$T_t$ is the normal or trend component, which represents the general shape of the demand pattern; $S_t$ is the seasonal component, and $I_t$ is the noise component of the peak demand. In the original setting the seasonal effect is a long-term seasonal stochastic influence on the curve. In the short-term real-time setting strategy, this may be viewed as the temperature/weather effect which varies throughout a day's operation, as given in equation (2).

$$T_t = T_{t-1} + q_t \tag{2}$$

Equation (3) may represent when the trend component is changed by a factor q at any given time t. This change q may be generated by u, a stationary, zero-mean, white noise process having an unknown variance, at any given time t. $I_t$ may be modelled to be sampled from a stationary, zero mean, and white noise process with an unknown variance, as in (4).

$$q_t = q_{t-1} + u_t \tag{3}$$

$$I_t = w_t \tag{4}$$

Additionally, a model of the change in demand pattern may be shown in (5):

$$\Delta X = X_t - X_{t-1} = (T_t + S_t + I_t) - (T_{t-1} + S_{t-1} + I_{t-1}) \tag{5}$$

The change in demand pattern may be simplified as (6) based on the fact that the seasonal effect between two very short increments is negligible.

$$\Delta X = X_t - X_{t-1} = q_t + \varepsilon_t \tag{6}$$

In the above equation, E may be the aggregated stationary, zero-mean, white noise process, constituting the trending random walk and the noise random walk. This tells that the change in load may be a function of change factor and random noise processes.

The electrical load can be modelled as a class of generalized Ornstein-Uhlenbeck processes and therefore it is a mean reverting process. Together with the short-term assumption listed above, equation (7) may be written as shown below.

$$dX_t = q_t(1/X_{t-1})dt + \sigma d\varepsilon_t \quad (7)$$

By assuming $q_t \gg \varepsilon_t$, the Rate-of-Change (ROC) may be denoted as the relative change factor:

$$ROC = (X_t - X_{t-1})/(t_t - t_{t-1}) = (q_t + \varepsilon_t)/(t_t - t_{t-1}) \quad (8)$$

$$\text{Then, } ROC = dX_t/d_t \quad (9)$$

Equation (9) may approach zero when the demand curve gets close to its peak owing to the fact that this process is mean reverting thus the ROC slows down when the electrical demand curve is about to revert.

$$\lim_{X_t \to peak} \frac{dX_t}{dt} = 0 \mid \quad (10)$$

ROC Methodology

A Rate-of-Change (ROC) method, denoted as Adaptive Rate of Change (ARC), may be used to forecast and/or manage the immediate electrical maximum demand without the restriction to inputting additionally external information is described. The ROC method may be used by individual firms to take preventive measures to avoid high demand. Further, rather than forecasting the magnitude of the load demand, the ROC method may predict the time that the maximum demand may occur. Additionally, the ROC method may be applied by manufacturing facilities, commercial buildings, and even residential loads.

FIG. 1 shows a block diagram of a system and environment for forecasting and managing daily electrical maximum demands. Referring to FIG. 1, the system and environment 100 includes an intelligent energy consumption computing platform 110, a utility provider computing platform 120, an enterprise organization computing platform 130, and a network 140.

The intelligent energy consumption computing platform 110 may include one or more computing devices and/or servers. Additionally, and/or alternatively, the intelligent energy consumption computing platform 110 may be a cloud computing server and/or computing platform. The intelligent energy consumption computing platform 110 may receive information, such as data packets, from the utility provider computing platform 120 and/or the enterprise organization computing platform 130. Furthermore, the intelligent energy consumption computing platform 110 may receive the information via a network 140.

The utility provider computing platform 120 may include one or more computing devices and/or servers. Additionally, and/or alternatively, the utility provider computing platform 120 may be a cloud computing server and/or computing platform. The utility provider computing platform 120 may receive information, such as data packets, from the intelligent energy consumption computing platform 110 and/or the enterprise organization computing platform 130. Furthermore, the utility provider computing platform 120 may receive the information via the network 140. In some instances, the utility provider computing platform 120 may be a computing platform for a utility provider. The utility provider may provide electricity and/or other resources to one or more organizations or entities (e.g., manufacturing facilities, enterprise organizations, residential buildings, and/or commercial buildings). For instance, the utility provider may provide electricity to an enterprise organization, such as an enterprise organization managing the enterprise organization computing platform 130.

The enterprise organization computing platform 130 may include one or more computing devices and/or servers. Additionally, and/or alternatively, the enterprise organization computing platform 130 may be a cloud computing server and/or computing platform. The enterprise organization computing platform 130 may receive information, such as data packets, from the utility provider computing platform 120 and/or the intelligent energy consumption computing platform 110. Furthermore, the enterprise organization computing platform 130 may receive the information via a network 140.

In some examples, the enterprise organization computing platform 130 may include one or more subsystems, such as a first subsystem 131, a second subsystem 132, and/or a third subsystem 133. The first subsystem 131, second subsystem 132, and/or the third subsystem 133 may perform tasks for the enterprise organization. For example, the first subsystem 131 may a chiller system; the second subsystem 132 may be a Heating, Ventilation Air-Conditioning (HVAC) system; the third subsystem 133 may be a lighting system.

Figure 2A:
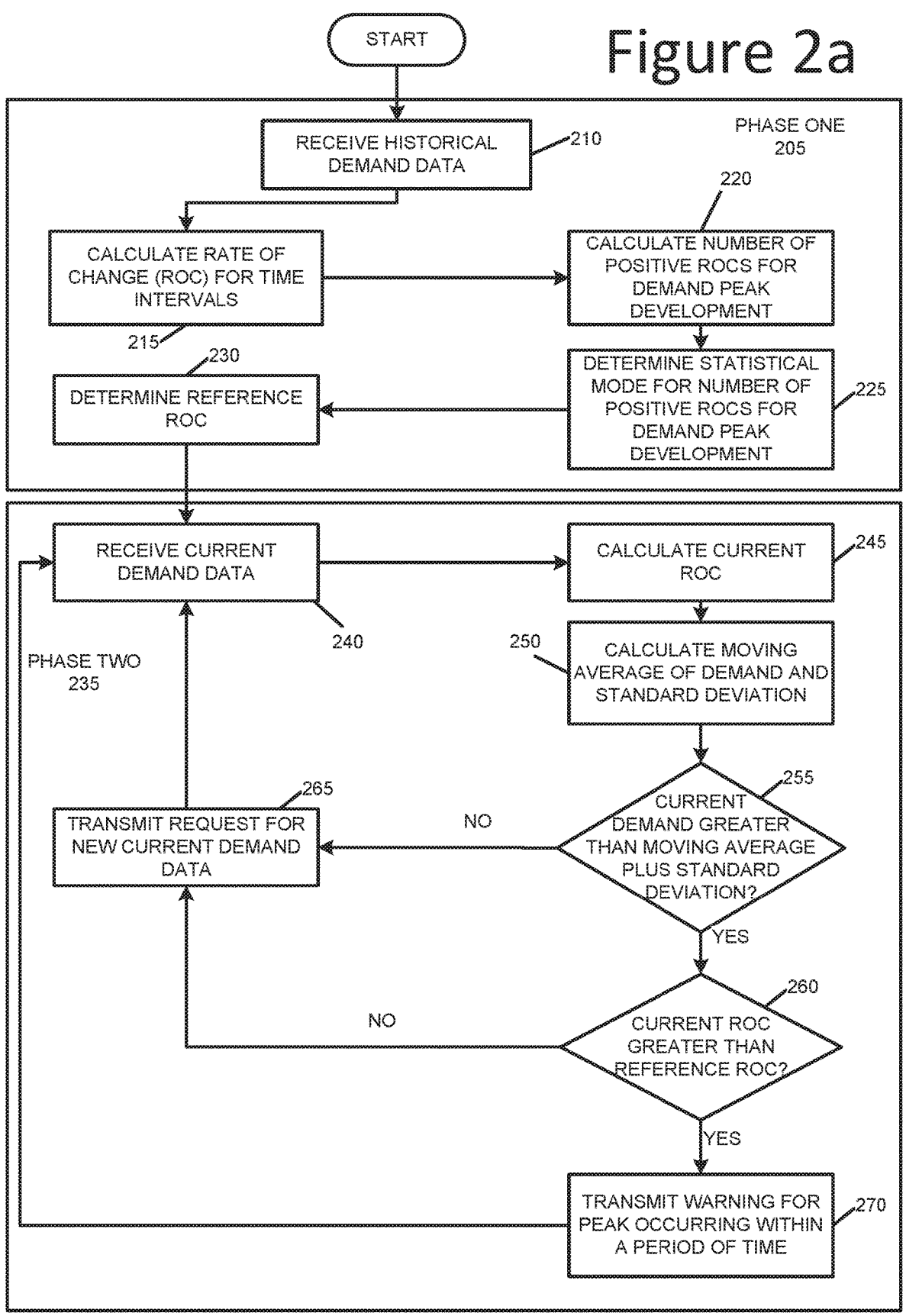
FIGS. 2a and 2b show example flowcharts illustrating a system and method for forecasting and managing daily electrical maximum demands.
Figure 2B:
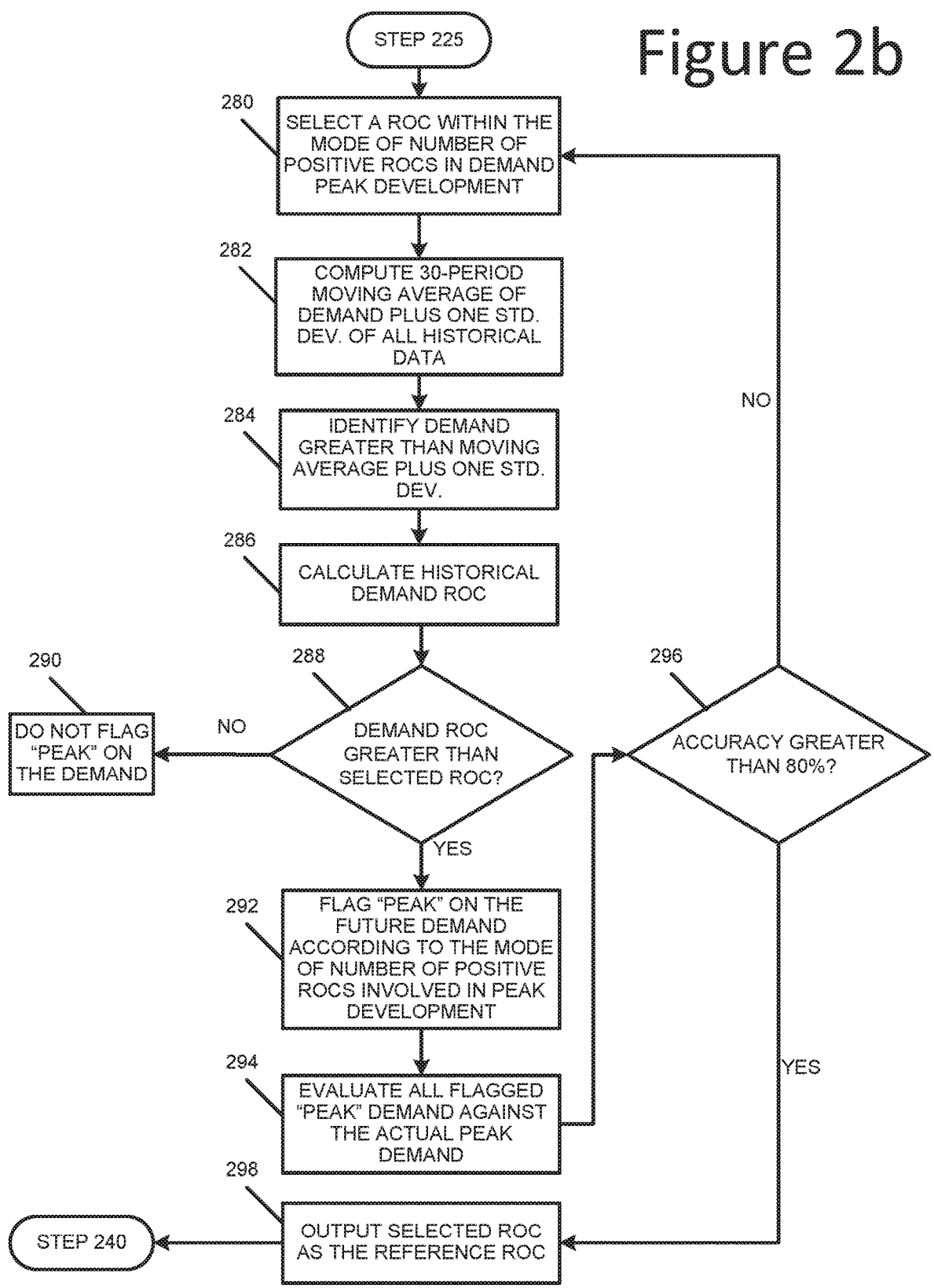

FIGS. 2a and 2b show example flowcharts illustrating a method for forecasting and managing daily electrical maximum demands. Referring to FIG. 2a, the ROC method 200 may include two phases, such as a historical trend analysis phase 205 and a real time data evaluation phase 235. As mentioned previously, the ROC method 200 may forecast and manage daily electrical maximum demands for entities or organizations such as manufacturing facilities, commercial buildings, and even residential loads.

Starting from the historical trend analysis phase 205, at step 210, a computing system, such as the intelligent energy consumption computing platform 110, may receive historical demand data. For example, as mentioned above, the intelligent energy consumption computing platform 110 may receive historical demand data from the utility provider computing platform 120 and/or the enterprise organization computing platform 130. For instance, the intelligent energy consumption computing platform 110 may receive historical demand data for an enterprise organization.

Figure 3:
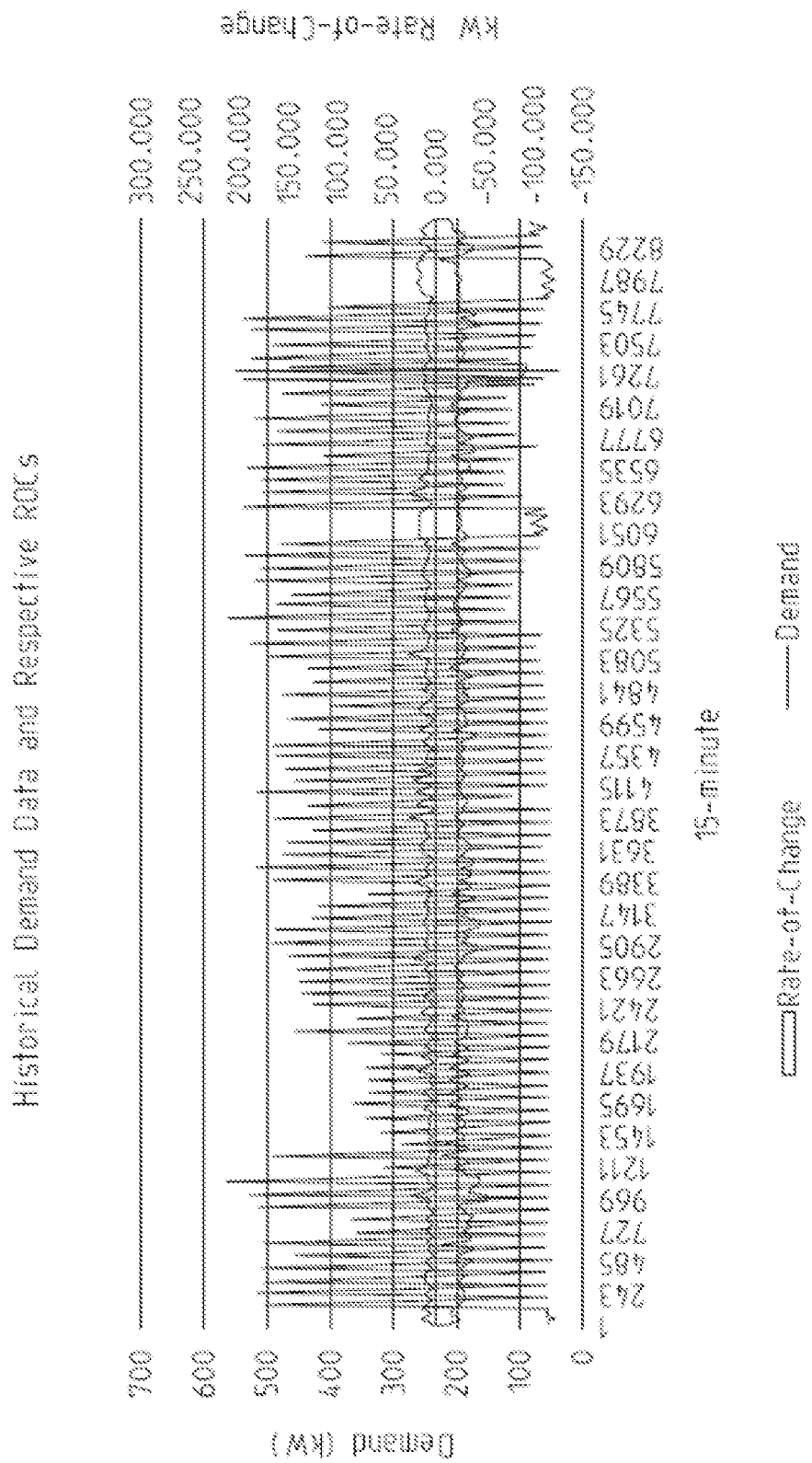
FIG. 3 shows an example graph of the historical demand data and/or rate-of-change for the historical demand data.

FIG. 3 shows an example graph of the historical demand data and/or rate-of-change for the historical demand data. FIG. 3 is merely exemplary and in other examples, the historical demand data and respected ROCs may be for another type of enterprise organization, such as a manufacturing facility, a commercial building, and/or a residential load (e.g., a user's home). For instance, FIG. 3 may show historical demand data for a manufacturing company in Indiana. The company may employ about 200 people and may occupy a 107,300 ft$^2$ facility. The plant may operate about 6,240 hours annually and may produce sheet metal enclosures for generators and large motors and may also provide testing to those generators and motors. Additionally, and/or alternatively, FIG. 3 may show an electrical demand pattern for a time range, such as for a time range from September 2014 to December 2014. This time range may include a summer period and a winter period in which long holidays, such as the Thanksgiving and the Christmas, are also presented.

At step 215, the intelligent energy consumption computing platform 110 may calculate rate of changes (ROC) for one or more time intervals. For example, the intelligent energy consumption computing platform 110 may use the received historical demand data to calculate rate of changes (ROC) for one or more time intervals. FIG. 4 shows an example table for calculating a number of rate-of-changes (ROCs) to determine maximum daily demands. For example, FIG. 4 may show one or more time intervals from 2:30 PM to 3:45 PM and may also show the electrical demands in kilowatts (kW). The intelligent energy consumption computing platform 110 may use the time intervals and electrical demands to calculate the rate of change. For example, to calculate the ROC, the intelligent energy consumption computing platform 110 may subtract the current electrical demand, such as 278.64 kW, from the previous electrical demand, such as 289.3 kW. Then, the intelligent energy consumption computing platform 110 may divide the result by a time interval, such as 15 minutes, to determine the ROC of –0.710. Referring back to FIG. 3, the intelligent energy consumption computing platform 110 may calculate the ROC for one or more time intervals, including but not limited to the entire historical demand data.

At step 220, the intelligent energy consumption computing platform 110 may calculate a number of positive ROCs for demand peak development. For example, the intelligent energy consumption computing platform 110 may determine a number or amount of positive ROCs corresponding to the development of a demand maximum or peak electrical demand. Referring back to FIG. 3, intelligent energy consumption computing platform 110 may determine a peak or maximum electrical demand value for a time period, such as one day. The intelligent energy consumption computing platform 110 may determine a peak electrical demand value, such as 461.16 kW at 3:30 PM. Next, the intelligent energy consumption computing platform 110 may identify and/or calculate a number of positive ROCs for the demand peak development. For instance, the intelligent energy consumption computing platform 110 may determine that the previous three time intervals (e.g., 2:45 to 3:00, 3:00 to 3:15, and 3:15 to 3:30) are positive ROCs (e.g., 8.088, 3.432, and 0.0648). Using this information, the intelligent energy consumption computing platform 110 may determine a number of positive ROCs, such as three, for the demand peak development for that day. Referring to FIG. 3, the intelligent energy consumption computing platform 110 may calculate a number of positive ROCs for demand peak development for one or more time intervals, including but not limited to the entire historical demand data. For example, intelligent energy consumption computing platform 110 may calculate a number of positive ROCs for each day of the historical demand data.

Figure 5:
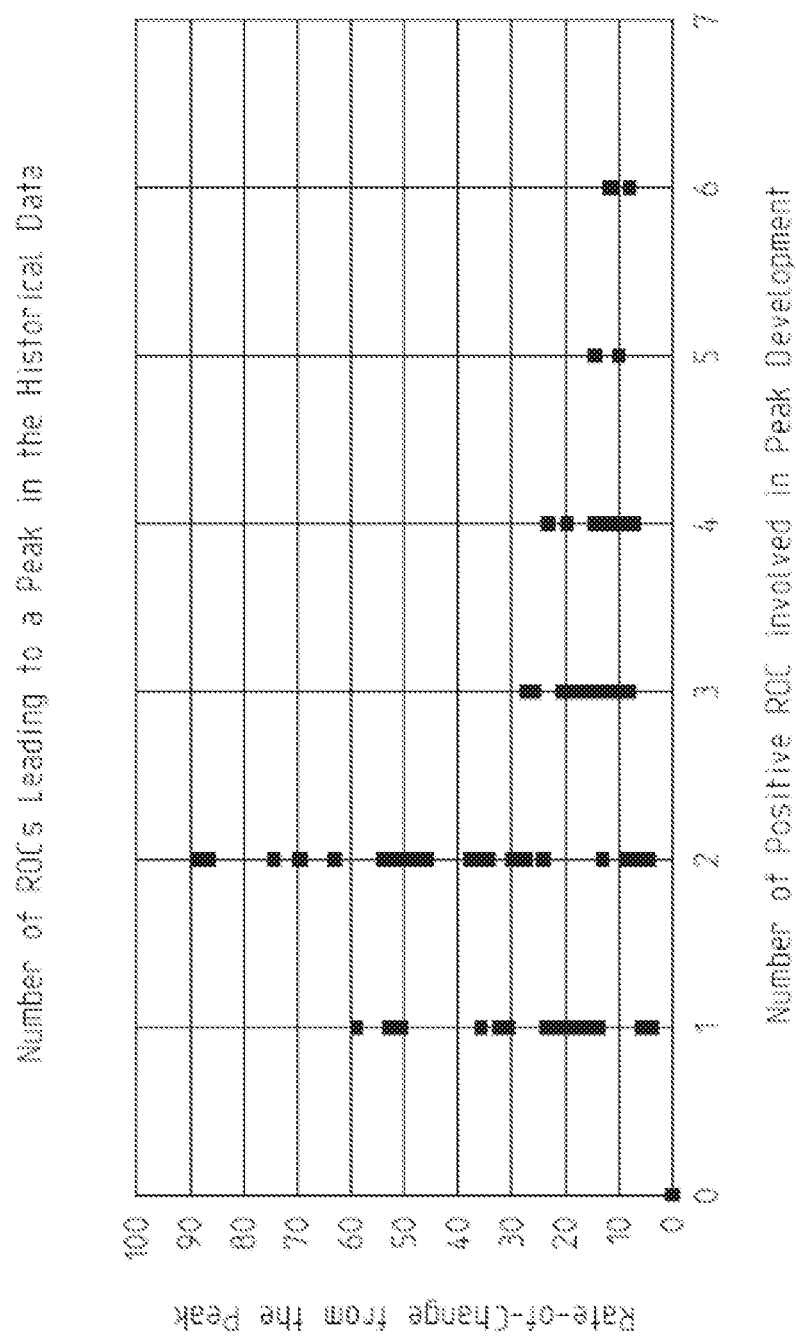
FIG. 5 shows an example boxplot for a number of ROCs leading to a peak in the historical data.

At step 225, the intelligent energy consumption computing platform 110 may determine a statistical mode for the number of positive ROCs for demand peak development. For example, using the number of positive ROCs calculated at step 220, the intelligent energy consumption computing platform 110 may graph the values in a boxplot. FIG. 5 shows an example boxplot for a number of ROCs leading to a peak in the historical data. The intelligent energy consumption computing platform 110 may use the boxplot, such as the boxplot shown in FIG. 5, to determine a statistical mode for the number of positive ROCs for demand peak development. The statistical mode may be a value that appears most often in a data set. For example, referring to FIG. 5, the intelligent energy consumption computing platform 110 may determine that the statistical mode for demand peak development is two positive ROCs.

At step 230, the intelligent energy consumption computing platform 110 may determine a reference ROC, such as a peak inducing reference ROC, based on the statistical mode. FIG. 2b shows an example flowchart illustrating a method for determining a reference ROC. Referring to FIG. 2b, the intelligent energy consumption computing platform 110 may take the historical demand data to determine the statistical mode of number of positive ROCs in the demand peak development as described above at steps 210 and 225. Next, the intelligent energy consumption computing platform 110 may take in one or more of the initial (peak inducing) ROCs that follows with the same total number of positive ROCs towards the peak development. The intelligent energy consumption computing platform 110 may then start with the ROC with the lowest numeric value as a test reference ROC. Once the intelligent energy consumption computing platform 110 has identified all the potential demand peaks (e.g., using the test reference ROC), it may then evaluate the accuracy against the actual peak locations (e.g., from the historical demand data). If the accuracy is larger than a value, such as 80%, then the intelligent energy consumption computing platform 110 may use this ROC as the reference ROC for the actual forecast period. If not, the computing platform 110 may repeat and select a different ROC (e.g., the next highest numeric value) to use as the test reference ROC.

In other words, referring to FIG. 2b, at step 280, the computing platform 110 may select a ROC value within the mode of number of positive ROCs in the demand peak development. In some examples, the intelligent energy consumption computing platform 110 may select the ROC with the lowest numeric value as the ROC to use. At step 282, the computing platform 110 may compute a moving average of the demand plus one standard deviation for one or more periods (e.g., one or more-time ranges), such as a 30 day moving average. At step 284, the computing platform 110 may identify instances when the demands are greater than the moving average plus the one standard deviation from step 282. At step 286, the computing platform 110 may calculate the historical demand ROC.

At step 288, the computing platform 110 may determine whether the historical demand ROC is greater than the selected ROC. If not, at step 290, the computing platform 110 may determine to not flag "peak" on the demand. If yes, at step 292, the computing platform 110 may flag the "peak" on the future demand according to the mode of the positive ROCs involved in the peak development. At step 294, the computing platform 110 may evaluate all flagged "peak" demands against the actual peak demand.

At step 296, the computing platform 110 may determine whether the evaluation of flagged "peak" demand against the actual peak demand has an accuracy greater than a value, such as 80%. If not, the process moves back to step 280 and repeats by selecting a different ROC. If so, the process moves to step 298 and the computing platform 110 outputs the selected ROC as the reference ROC.

After determining the reference ROC, the method 200 may move to phase two 235. As described previously, phase two may be a real time data evaluation phase 235. At step 240, the intelligent energy consumption computing platform 110 may receive current demand data. In some examples, the current demand data is real-time data corresponding to an enterprise organization, such as the manufacture company in Indiana described above. In some embodiments, the intelligent energy consumption computing platform 110 may receive the current demand data from the utility provider computing platform 120 and/or the enterprise organization computing platform 130. For instance, the intelligent energy consumption computing platform 110 may receive the current demand data or current electrical usage for the enterprise organization.

Additionally, and/or alternatively, the intelligent energy consumption computing platform 110 may receive current demand data from one or more subsystems, such as a first subsystem 131, a second subsystem 132, and/or a third subsystem 133. The first subsystem 131, second subsystem 132, and/or the third subsystem 133 may perform tasks for the enterprise organization. In some instances, the first subsystem 131 may a chiller system; the second subsystem 132 may be a Heating, Ventilation Air-Conditioning (HVAC) system; the third subsystem 133 may be a lighting system. The intelligent energy consumption computing platform 110 may receive the current demand data or the current electrical usage for one or more subsystems.

At step 245, the intelligent energy consumption computing platform 110 may calculate a current ROC. For example, the intelligent energy consumption computing platform 110 may use the received current demand data to calculate a current ROC. The current ROC may be the current demand data, such as 100 kW, minus the previous demand data, such as 90 kW. Thus, the current ROC may be 10 kW.

At step 250, the intelligent energy consumption computing platform 110 may calculate a moving average of demand and/or a standard deviation. For example, the intelligent energy consumption computing platform 110 may calculate a moving average of demand and/or a standard deviation over a range of time, such as over the previous thirty time intervals. The moving average may be a succession of averages derived from successive segments. The standard deviation may be a quantity calculated to indicate the extent of deviation for the range of time.

At step 255, the intelligent energy consumption computing platform 110 may determine whether the current demand is greater than the moving average value plus one standard deviation value. In some examples, at step 240, the intelligent energy consumption computing platform 110 may receive the current demand data indicating the current demand (e.g., electrical usage) for the enterprise organization is 100 kW. At step 250, the intelligent energy consumption computing platform 110 may calculate the moving average of the demand as 80 kW and the standard deviation as 10 kW. Thus, in such examples, the intelligent energy consumption computing platform 110 may determine that the current demand is greater than the moving average plus one standard deviation value and the method 200 may move to step 260. However, in some instances, if the current demand is less than or equal to the moving average plus one standard deviation value, then the method 200 may move to step 265.

At step 260, the intelligent energy consumption computing platform 110 may determine whether the current ROC is greater than the reference ROC. As described above, the current ROC may be calculated at step 245. Further, the reference ROC may be calculated at step 230. The intelligent energy consumption computing platform 110 may compare the current ROC with the reference ROC. If the current ROC is greater than the reference ROC, then the method 200 may move to step 270. However, if the current ROC is less than or equal to the reference ROC, then the method 200 may move to step 265.

At step 265, the intelligent energy consumption computing platform 110 may transmit a request for new current demand data. For example, the intelligent energy consumption computing platform 110 may transmit a request for another iteration of the current data and the process may repeat from step 240. Additionally, and/or alternatively, the intelligent energy consumption computing platform 110 may calculate a new moving average and/or standard deviation based on the demand data.

After checking if the result meets the criteria in steps 255 and 260, at step 270, the intelligent energy consumption computing platform 110 may transmit a warning for a peak occurring within a period of time. For example, the intelligent energy consumption computing platform 110 may forecast the peaks in a reasonable time window based on the historical analysis, which would be Short Term Load Forecasting (STLF).

In some instances, the intelligent energy consumption computing platform 110 may use the statistical mode determined at step 225 to forecast the peaks. For example, as mentioned previously, the statistical mode for the number of positive ROCs may be the number of positive ROCs until the data reaches a peak or maximum. Thus, in some examples, if the statistical mode of positive ROCs is two, then it may be thirty minutes (e.g., two fifteen minute time intervals) until the data reaches a peak. After reaching step 270, the intelligent energy consumption computing platform 110 may indicate that the maximum or peak value may be within a time interval based on the statistical mode (e.g., thirty minutes).

The intelligent energy consumption computing platform 110 may issue a warning for the upcoming maximum demand. For instance, in some examples, the intelligent energy consumption computing platform 110 may issue a warning that the maximum demand will occur in the next thirty minutes. The intelligent energy consumption computing platform 110 may generate one or more commands directing a computing platform, such as the utility provider computing platform 120 and/or the enterprise organization computing platform 130 to display the warning or alert. Additionally, and/or alternatively, the intelligent energy consumption computing platform 110 may generate one or more commands directing a subsystem, such as the first subsystem 131, the second subsystem 132, and/or the third subsystem 133, to display the warning or alert. After generating the one or more commands, the intelligent energy consumption computing platform 110 may transmit the one or more commands to the enterprise organization computing platform 130, the utility provider computing platform 120, the first subsystem 131, the second subsystem 132, and/or the third sub system 133.

Additionally, and/or alternatively, the intelligent energy consumption computing platform 110 may generate one or more commands directing a computing platform, such as the utility provider computing platform 120 and/or the enterprise organization computing platform 130, to automatically and/or manually lower the electrical consumption demand. The one or more commands directing the computing platform to automatically and/or manually lower the electrical consumption demand may include rescheduling the equipment (including starting and/or shutting down equipment), setting adjustments, such as lowering the pressure or temperature settings, and/or using power generators. Additionally, and/or alternatively, in some instances, the intelligent energy consumption computing platform 110 may generate one or more commands directing a subsystem, such as the first subsystem 131, the second subsystem 132, and/or the third subsystem 133, to automatically and/or manually lower the electrical consumption demand. After generating the one or more commands, the intelligent energy consumption computing platform 110 may transmit the one or more commands to the enterprise organization computing platform 130, the utility provider computing platform 120, the first subsystem 131, the second subsystem 132, and/or the third sub system 133.

After transmitting the commands at step 270, the method may move back to step 240. Additionally, and/or alternatively, the method may be a closed loop system, and the intelligent energy consumption computing platform 110 may continue to receive current demand data, monitor the current demand data, and transmit warnings for the peak occurrence of the demand data. For example, after transmitting a warning for the peak occurring within a period of time at step 270, the intelligent energy consumption computing platform 110 may transmit one or more commands directing the enterprise organization computing platform 130 and/or a subsystem, such as the first subsystem 131, the second subsystem 132, and/or the third subsystem 133, to automatically and/or manually lower the electrical consumption demand. The subsystem may include controllers and/or computing platforms at the enterprise organization (e.g., the manufacturing plant). Next, the controllers and/or computing platforms may perform the commands (e.g., shutting down equipment), which may lower the current electrical demand. After performing the commands, the controllers and/or computing platforms (e.g., the enterprise organization computing platform 130) may transmit current demand data back to the intelligent energy consumption computing platform 110. At step 240, the intelligent energy consumption computing platform 110 may receive the current demand data and the process may repeat continuously in the closed loop system.

Figure 8A:
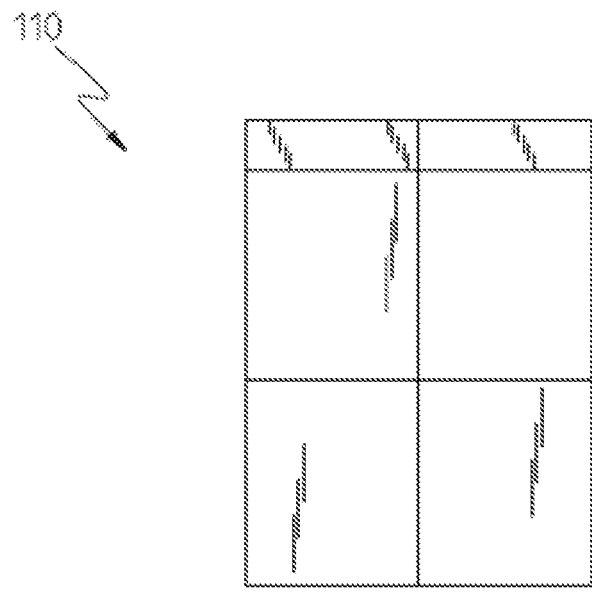
FIGS. 8a and 8b show an example device used for forecasting and managing daily electrical maximum demands.
Figure 8B:
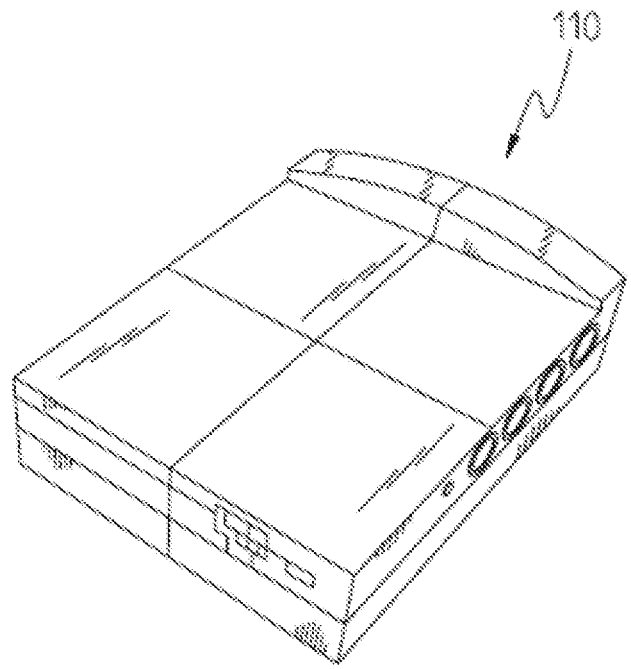

FIGS. 8*a* and 8*b* show example devices used for forecasting and managing daily electrical maximum demands. For example, FIGS. 8*a* and 8*b* may show different views or angles of a device used for forecasting and managing daily electrical maximum demands. The intelligent energy consumption computing platform 110 and/or the enterprise organization computing platform 130 may include one or more devices shown in FIGS. 8*a* and 8*b*. In some examples, the intelligent energy consumption device shown in FIGS. 8*a* and 8*b* is the intelligent energy consumption computing platform 110. In other words, the device 110 may be configured to perform the method 200 described above.

The device may have the capability to monitor sub-system demand remotely or wired through CAT5 cable, 0-10 V DC cable or 4-20 mA cable. The device may have the capability to import/export data to/from a cloud database. The device may run by an adaptor or an external battery pack. The internal 9V battery included in the device may provide the power to run the device in case of power outage. The device may be easily set-up without any electrical knowledge. In some examples, the device may include a wireless antenna, a CAT5 communication port and/or capability, a 0-10 VDC cable port or a 4-20 mA cable input port, and/or a Micro B port to connect to the power supply.

Figure 9:
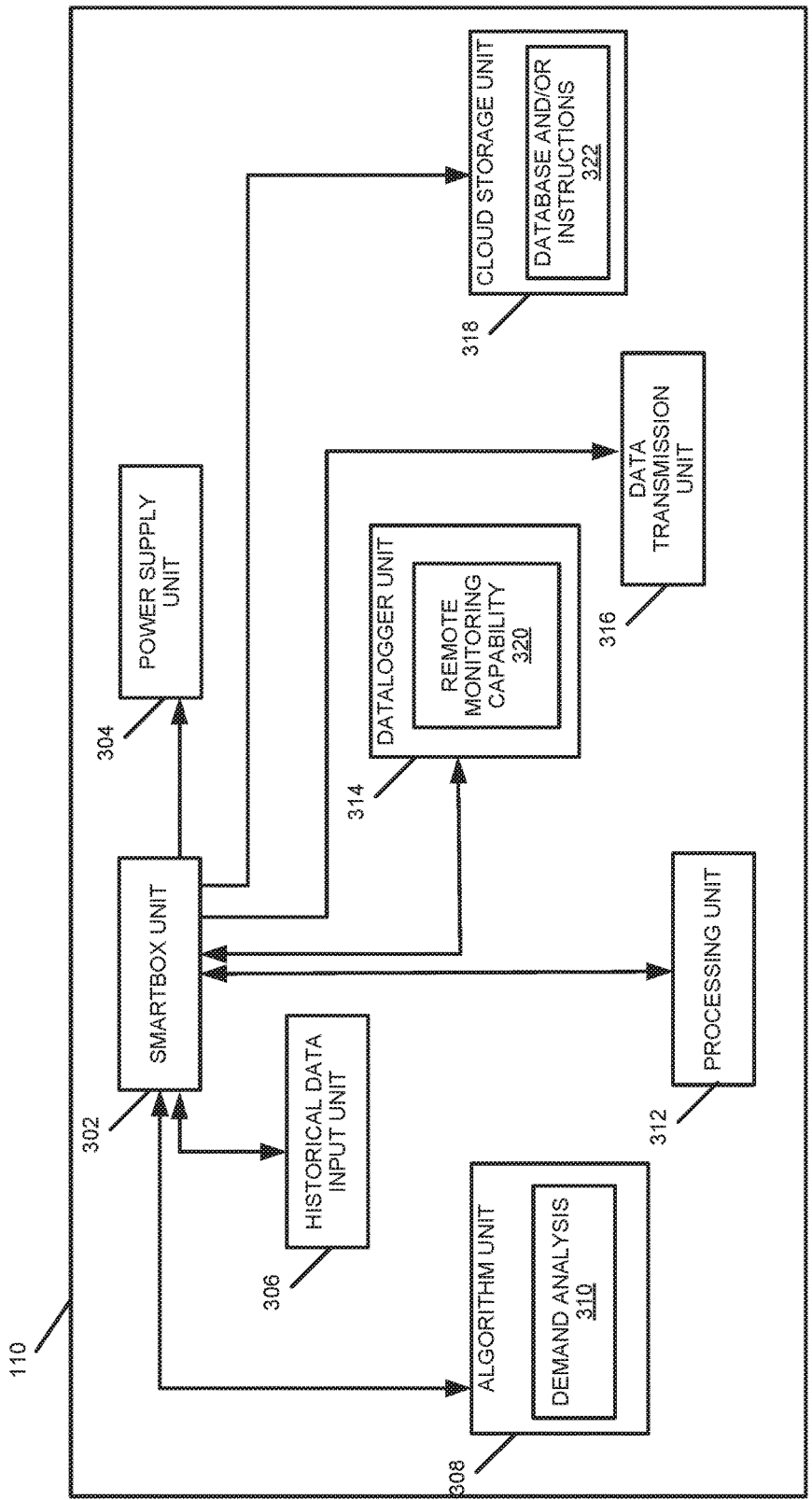
FIG. 9 shows an example device composition and block diagram used for forecasting and managing electrical maximum demands.

FIG. 9 shows an example device composition and block diagram used for forecasting and managing electrical maximum demands. For example, FIG. 9 may show an example device composition (e.g., components or units) of the device 110 shown in FIGS. 8*a* and 8*b*. Examples of computing devices include but are not limited to workstations, laptops, desktops, tablet computers, hand-held devices, servers, cloud computing platforms, integrated circuits and the like, all of which are contemplated within the scope of the system 100 and/or the device 110.

The illustrative device 110 is not intended to suggest any limitation as to the scope of use or functionality of embodiments of the present disclosure. Neither should the illustrative device 110 be interpreted as having any dependency or requirement related to any single component or combination of components illustrated therein. Additionally, various components depicted in FIG. 9 are, in embodiments, integrated with various ones of the other components depicted therein (and/or components not illustrated), all of which are considered to be within the ambit of the present disclosure.

The device 110 includes a smartbox unit 302, a power supply unit 304, a historical data input unit 306, an algorithm unit 308, a processing unit 312 (e.g., one or more processors, a data logger unit 314, a data transmission unit 316, and a cloud storage unit 318. In operation, the smartbox unit 302 and/or the processing unit 312 may be configured to control the operation of the device 110. For example, the smartbox unit 302 and/or the processing unit 312 may be configured to execute instructions (e.g., instructions within the cloud storage unit 318) to forecast and manage electrical maximum demands for one or more entities. In some instances, the smartbox unit 302 and/or the processing unit 312 may be configured to control and/or command the other units/components within the device 110 to forecast and manage the electrical maximum demands. The processing unit 312 may receive data. Additionally, and/or alternatively, the processing unit 312 may include a wireless interface/module and/or a wired interface (e.g., a RJ45 interface). The processing unit 312 may use the wireless module and/or wired interface to transmit the data to other units, devices, and/or computing platforms within the system 100.

The power supply unit 304 may be a battery, outlet port, and/or another type of power source that provides power to the device 110. The historical data input unit 306 may be configured to receive, process, analyze, determine, and/or store historical data (e.g., historical demand data) as described above. The historical data input unit 306 may receive historical data from the smartbox unit 302.

The algorithm unit 308 may be configured to process, analyze, calculate, and/or use algorithms to determine the electrical maximum demands. In some instances, the algorithm unit 308 may receive electrical demand data, process the demand data, and generate/provide the warning signal. For example, the algorithm unit 308 may include the capability to determine the demand analysis 310. In other words, the device 110 may have the capability to analyze the demand pattern and give the warning signal to the entity (e.g., the plant manager).

The datalogger unit 314 may be any device or component that records data, such as electrical demand data, over a period of time. For example, the datalogger unit 314 may include remote monitoring capability 320 that monitors the electrical system demand of the entity remotely. In some instances, the datalogger unit 314 may receive the electrical demand data from the utility provider computing platform 120. The cloud storage unit 318 may include a database and be a storage (memory) location within the device 110. For example, the cloud storage unit 318 may include a database and/or store one or more instructions. The device 110 may use the cloud storage unit 318 to import and/or export data to and from a cloud database. Further, the instructions within the cloud storage unit 318, when executed by the processing unit 312, may cause the device 110 (e.g., the intelligent energy consumption computing platform 110) to perform the method 200 (e.g., to forecast and manage the electrical maximum demands).

The data transmission unit 316 may be configured to receive and/or provide to one or more devices and/or computing platforms such as the computing platforms 120 and/or 130. For example, the data transmission unit 316 may be configured to receive the electrical demand data/monitor the electrical system demand remotely, provide the warning signals to the entity, and/or import/export data to and from the cloud database.

Figure 6:
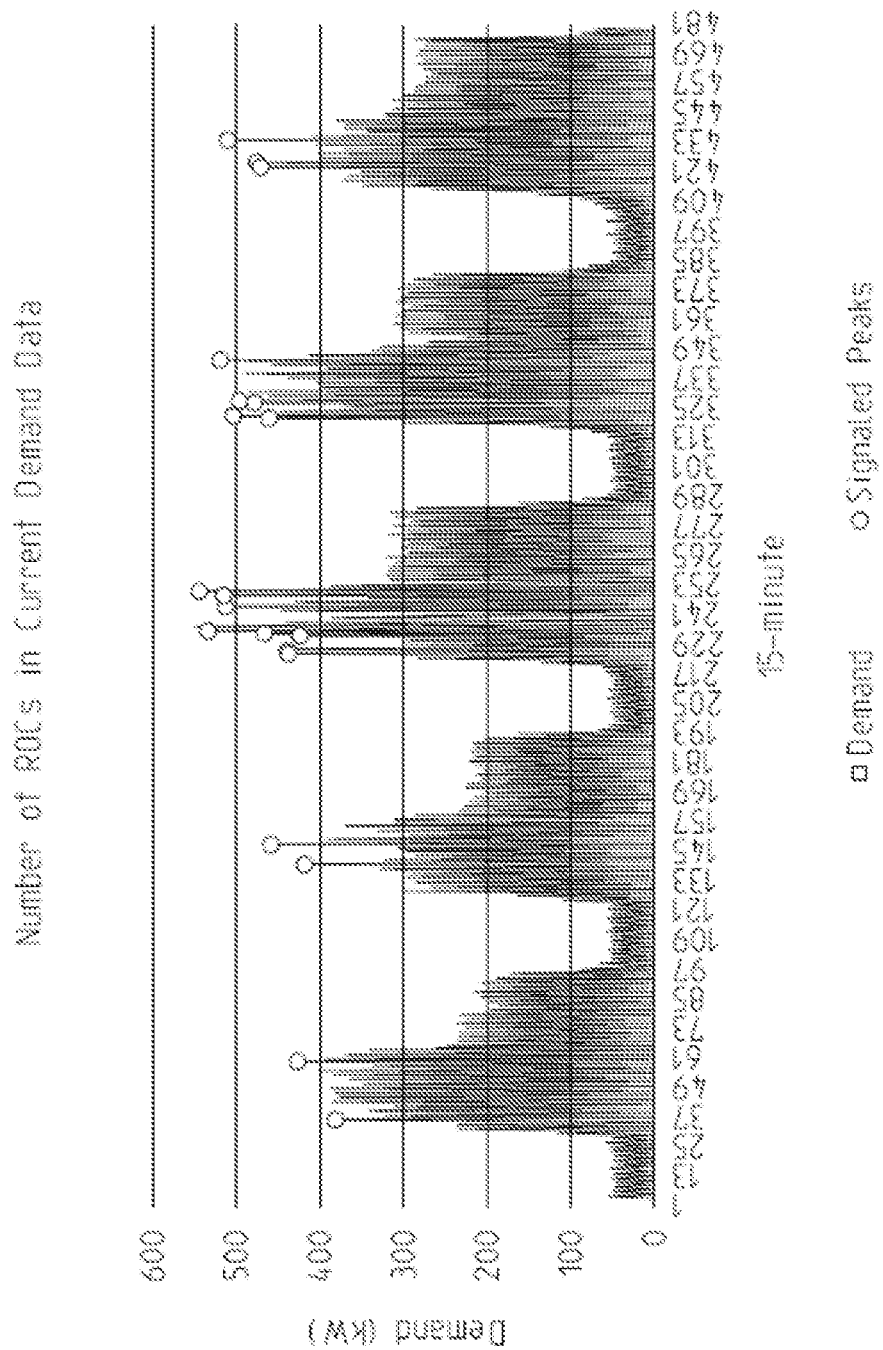
FIG. 6 shows an example graph of the number of ROCs in the current demand data.

FIG. 6 shows an example graph of the number of ROCs in the current demand data. For example, FIG. 6 may show the demand value for a time period, such as for five consecutive days, and identified peak values using the method 200. The dots may be the times when the warning criteria are met. As shown in FIG. 6, the method may capture the daily maximum demand and may also identify the secondary, and sometimes, tertiary demand spikes. This may be useful for the plant manager to reschedule the process more efficiently to avoid high demand charges. This simulation may take timely data step by step with or without looking into any future pattern. The methodology may capture the demand peak prior to certain time intervals. In this case the confidence time window is 30 minutes such that a demand spike will happen within 30 minutes after the warning is shown.

Verification of Method

To validate the method, the proposed methodology may predict the daily peak within two sampling intervals. In this particular simulation, the sampling rate being 15 minutes, the method can give warning of daily peak within 30 minutes. Because the methodology is to predict the time of the peak rather than construct a regression line, Person's chi-squared is suitable in the validation. The test is to evaluate how likely it is that any observed difference between the sets arose by chance. A standard Pearson's chi-squared test is performed by categorizing demand time series into a binomial pair, 1 and 0. 1 means a daily peak occurrence while 0 means the rest. The prediction made by the methodology is categorized so that 1 means it successfully predicts the time of the daily peak within 30 minutes. 0 means there is no prediction or there is a false signal. The test of probability is stated as follows where p is the probability of observation to occur, 0 is the number of observation of type I, and N is the total observation. And one can develop a contingency table to show the probability of each type of observation. And a binomial case of goodness of fit can be developed to calculate the statistical significance.

$$p_i = \frac{O_i}{N} \quad (11)$$

$$x^2 = \sum_{i=1}^{k} \frac{(N_i - np_i)^2}{np_i} = \sum_{i=1}^{k} \frac{(O-E)^2}{E} \quad (12)$$

The null hypothesis is that the methodology will create an unbiased result which; therefore, should catch 50% of the peak because the test has only two categorical variables. If there is less than 50% accuracy of the model the null hypothesis is not rejected. As it is explained in Table 2 by using IBM SPSS software, and considering demand data from January, 2015 to June, 2015 for three different manufacturing companies, 80% of the actual demand peaks fall within the prediction. It also shows the method fails to predict the daily maximum demand in 11.4% of the time. As the result the P-value is much smaller than 0.05 and thus the null hypothesis is rejected.

CONCLUSION

A novel method has been proposed for short and medium-term load forecasting by analyzing demand trend data and incorporating moving average calculation as well as rate of change formularization to develop an electrical maximum demand forecasting algorithm. The results reveal that the ARC method has at least the following advantages.

First, prior works in electrical maximum demand forecasting have been mainly focused on seasonal effects which are not always a feasible approach for industrial manufacturing facilities. Instead, the ARC method described above uses the historical data which can decrease the intrinsic uncertainties associated with demand forecasting.

Second, the proposed method described above has the simplicity that not only needs less input but also runs faster.

Third, the proposed method described above has been validated by using chi-square method and shown to be accurate for short-term load forecasting.

Fourth, the ARC method is adaptive to the growing and dynamic systems, i.e., increasing production, or expanding the electric network in the facility, by calculating ROC using current demand data.

The proposed method has at least these advantages compared to the conventional method. Because of its predicative nature and with categorical variables the Chi-square test is used to prove the method. Three different manufacturing facilities, with different load profile patterns, were selected as target case studies. The results reveal that 80% accuracy with a P-value approaches to 0 in three significant digits (<0.00).

The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. A method, comprising:
    receiving, by a first computing platform, historical demand data corresponding to historical electrical demand over a first period of time for an entity;
    determining, based on the historical demand data, a reference rate of change (ROC) and a statistical mode corresponding to a number of positive ROCs;
    receiving current demand data corresponding to current electrical demand over a second period of time;
    determining, based on the statistical mode, the reference ROC, and the current demand data, an alarm condition indicating a daily peak electrical demand for the entity;
    generating one or more commands directing a second computing platform to display the alarm condition, and wherein the one or more commands directs the second computing platform to reduce electrical consumption demand of the entity; and transmitting, by the first computing platform and to the second computing platform, the one or more commands directing the second computing platform to display the alarm condition indicating the daily peak electrical demand for the entity; and wherein the second computing platform causes electrical consumption to be reduced in response to the one or more commands.

2. The method of claim 1, wherein the receiving the historical demand data comprises receiving the historical demand data from a utility provider computing platform corresponding to a utility provider.

3. The method of claim 1, wherein the entity is at least one of: a manufacturing facility, a residential building, and a commercial building.

4. The method of claim 1, wherein the historical demand data indicates an electrical demand of the entity for a plurality of time ranges, and wherein the method further comprises:

calculating, based on the electrical demand of the entity, a plurality of ROCs, wherein each ROC from the plurality of ROCs has a corresponding time range from the plurality of time ranges, and wherein the determining the reference ROC and the statistical mode is based on the plurality of ROCs corresponding to the plurality of time ranges.

5. The method of claim 4, further comprising:

determining a plurality of peak electrical demands for the plurality of time ranges, wherein each of the plurality of peak electrical demands has a corresponding time range from the plurality of time ranges; and determining the number of positive ROCs, from the plurality of ROCs, for each of the plurality of peak electrical demands to develop, wherein the determining the reference ROC and the statistical mode is based on determining the statistical mode of the number of positive ROCs for the plurality of peak electrical demands.

6. The method of claim 5, wherein the number of positive ROCs for each of the plurality of peak electrical demands to develop comprises the number of positive ROCs corresponding to a subset of time ranges, from the plurality of time ranges, immediately prior to the corresponding time range for each of the plurality of peak electrical demands.

7. The method of claim 5, further comprising:

determining a current ROC from the current demand data, and wherein the determining the alarm condition is based on comparing the current ROC with the reference ROC.

8. The method of claim 1, wherein the current demand data comprises a current demand and a plurality of previous demands, and wherein the method further comprises:

calculating, from the plurality of previous demands, a moving average and a standard deviation, and wherein the determining the alarm condition is based on comparing the moving average plus the standard deviation with the current demand from the current demand data.

9. The method of claim 1, wherein the entity comprises a plurality of subsystems, and wherein the one or more commands directs the second computing platform to reduce electrical consumption demand of at least one subsystem from the plurality of subsystems.

10. An intelligent energy consumption device, comprising:

one or more processors; and memory storing instructions that, when executed by the one or more processors, causes an intelligent energy consumption computing device to:

receive historical demand data corresponding to historical electrical demand over a first period of time for an entity;

determine, based on the historical demand data, a reference rate of change (ROC) and a statistical mode corresponding to a number of positive ROCs;

receive current demand data corresponding to current electrical demand over a second period of time;

determine, based on the statistical mode, the reference ROC, and the current demand data, an alarm condition indicating a daily peak electrical demand for the entity;

generate one or more commands directing a second computing platform to display the alarm condition, wherein the one or more commands directs the second computing platform to reduce electrical consumption demand of the entity; and transmit, to the second computing platform, the one or more commands directing the second computing platform to display the alarm condition indicating the daily peak electrical demand for the entity, and wherein the second computing platform causes electrical consumption to be reduced in response to the one or more commands.

11. The intelligent energy consumption device of claim 10, wherein the intelligent energy consumption device receives the historical demand data by receiving the historical demand data from a utility provider computing platform corresponding to a utility provider.

12. The intelligent energy consumption device of claim 10, wherein the historical demand data indicates an electrical demand of the entity for a plurality of time ranges, and wherein the memory further stores instructions that, when executed by the one or more processors, causes the intelligent energy consumption computing platform to:

calculate, based on the electrical demand of the entity, a plurality of ROCs, wherein each ROC from the plurality of ROCs has a corresponding time range from the plurality of time ranges, and wherein the intelligent energy consumption device determines the reference ROC and the statistical mode based on the plurality of ROCs corresponding to the plurality of time ranges.

13. The intelligent energy consumption device of claim 12, wherein the memory further stores instructions that, when executed by the one or more processors, causes the intelligent energy consumption computing platform to:

determine a plurality of peak electrical demands for the plurality of time ranges, wherein each of the plurality of peak electrical demands has a corresponding time range from the plurality of time ranges;

determine the number of positive ROCs, from the plurality of ROCs, for each of the plurality of peak electrical demands to develop, and wherein the intelligent energy consumption device determines the reference ROC and the statistical mode based on determining the statistical mode of the number of positive ROCs for the plurality of peak electrical demands.

14. The intelligent energy consumption device of claim 13, wherein the number of positive ROCs for each of the plurality of peak electrical demands to develop comprises the number of positive ROCs corresponding to a subset of time ranges, from the plurality of time ranges, immediately prior to the corresponding time range for each of the plurality of peak electrical demands.

15. The intelligent energy consumption device of claim 12, wherein the memory further stores instructions that, when executed by the one or more processors, causes the intelligent energy consumption computing platform to:
   determine a current ROC from the current demand data, and
   wherein the intelligent energy consumption device determines the alarm condition based on comparing the current ROC with the reference ROC.

16. The intelligent energy consumption device of claim 10, wherein the current demand data comprises a current demand and a plurality of previous demands, and wherein the memory further stores instructions that, when executed by the one or more processors, causes the intelligent energy consumption computing platform to:
   calculate, from the plurality of previous demands, a moving average and a standard deviation, and
   wherein the intelligent energy consumption device determines the alarm condition based on comparing the moving average plus the standard deviation with the current demand from the current demand data.

17. The intelligent energy consumption device of claim 10, wherein the entity comprises a plurality of subsystems, and wherein the one or more commands directs the second computing platform to reduce electrical consumption demand of at least one subsystem from the plurality of subsystems.

18. A system comprising:
   an intelligent energy consumption computing platform;
   a utility provider computing platform in communication with the intelligent energy consumption computing platform; and
   an enterprise organization computing platform in communication with the intelligent energy consumption computing platform, and
   wherein the intelligent energy consumption computing platform comprises:
   one or more processors; and
   memory storing instructions that, when executed by the one or more processors, causes the intelligent energy consumption computing platform to:
      receive, from the utility provider computing platform, historical demand data corresponding to historical electrical demand over a first period of time for an entity;
      determine, based on the historical demand data, a reference rate of change (ROC) and a statistical mode corresponding to a number of positive ROCs;
      receive current demand data corresponding to current electrical demand over a second period of time;
      determine, based on the statistical mode, the reference ROC, and the current demand data, an alarm condition indicating a daily peak electrical demand for the entity;
      generate one or more commands directing the enterprise organization computing platform to display the alarm condition, wherein the one or more commands directs the second computing platform to reduce electrical consumption demand of the entity; and
      transmit, to the enterprise organization computing platform, the one or more commands directing the enterprise organization computing platform to display the alarm condition indicating the daily peak electrical demand for the entity, and wherein the second computing platform causes electrical consumption to be reduced in response to the one or more commands.

* * * * *

UNITED STATES PATENT AND TRADEMARK OFFICE
CERTIFICATE OF CORRECTION

PATENT NO. : 10,977,586 B2
APPLICATION NO. : 16/272759
DATED : April 13, 2021
INVENTOR(S) : Ali Razban et al.

Page 1 of 1

It is certified that error appears in the above-identified patent and that said Letters Patent is hereby corrected as shown below:

In the Specification

After Column 1, Line 11, insert the following paragraph:
--STATEMENT OF GOVERNMENTAL RIGHTS
This invention was made with government support under DE-EE0005530 and DE-EE0007711 awarded by the U.S. Department of Energy. The Government has certain rights in the invention.--

Signed and Sealed this
Twenty-fifth Day of October, 2022

Katherine Kelly Vidal
*Director of the United States Patent and Trademark Office*